United States Patent
Utz et al.

(10) Patent No.: US 12,555,661 B2
(45) Date of Patent: Feb. 17, 2026

(54) MEDICAL INFUSION LINE ELECTRONIC ILLUMINATOR

(71) Applicant: CHS HEALTHCARE VENTURES, INC, Decatur, GA (US)

(72) Inventors: Hans Utz, Decatur, GA (US); Dragan Nebrigic, Austin, TX (US)

(73) Assignee: CHS HEALTHCARE VENTURES, INC, Decatur, GA (US)

( * ) Notice: Subject to any disclaimer, the term of this patent is extended or adjusted under 35 U.S.C. 154(b) by 948 days.

(21) Appl. No.: 17/578,707

(22) Filed: Jan. 19, 2022

(65) Prior Publication Data

US 2022/0226563 A1 Jul. 21, 2022

Related U.S. Application Data

(60) Provisional application No. 63/138,961, filed on Jan. 19, 2021.

(51) Int. Cl.
  *A61M 5/14* (2006.01)
  *A61M 5/158* (2006.01)
  (Continued)

(52) U.S. Cl.
  CPC .............. *G16H 20/17* (2018.01); *A61M 5/14* (2013.01); *A61M 5/1582* (2013.01);
  (Continued)

(58) Field of Classification Search
  CPC .......... G16H 20/17; G16H 40/63; A61L 2/10; A61L 2202/14; A61L 2202/24;
  (Continued)

(56) References Cited

U.S. PATENT DOCUMENTS 5,041,086 A  8/1991  Koenig et al.
5,423,750 A  6/1995  Spiller
(Continued)

FOREIGN PATENT DOCUMENTS

AU   2007282071 A1   2/2008
CN   102847204 A    9/2012
(Continued)

*Primary Examiner* — Michelle M Iacoletti
*Assistant Examiner* — Maher Yazback
(74) *Attorney, Agent, or Firm* — Bryan L. Baysinger; Maynard Nexsen PC

(57) ABSTRACT

Aspects of systems and apparatuses for medical infusion illumination are disclosed. In one aspect a system for medical infusion line illumination is disclosed. The system comprising an electronic illuminator. The electronic illuminator comprising a printed circuit board ('PCB'), a light emitting diode ('LED'), a lens configured with the LED, a power source to supply power to the PCB and LED; and at least one sensory assembly. The LED and lens of the electronic illuminator are configured to a side scattering fiber optic cable. The side scattering fiber optic cable comprises a fiber funnel cap at a proximal end to receive light from the LED through the lens of the electronic illuminator. The side scattering fiber optic cable further comprises a protective end cap at a distal end, wherein the protective end cap is polished on an interior surface to reflect light from the LED of the electronic illuminator.

20 Claims, 12 Drawing Sheets

(51) Int. Cl.
*A61M 5/162* (2006.01)
*A61M 5/172* (2006.01)
*F21V 33/00* (2006.01)
*G02B 6/44* (2006.01)
*G16H 20/17* (2018.01)
*G16H 40/63* (2018.01)
*H05B 45/10* (2020.01)
*H05B 47/11* (2020.01)
*A61M 5/145* (2006.01)

(52) U.S. Cl.
CPC ............ *A61M 5/162* (2013.01); *A61M 5/172* (2013.01); *F21V 33/0068* (2013.01); *G02B 6/4442* (2013.01); *G02B 6/4482* (2013.01); *G16H 40/63* (2018.01); *H05B 45/10* (2020.01); *H05B 47/11* (2020.01); *A61L 2202/14* (2013.01); *A61L 2202/24* (2013.01); *A61M 2005/1401* (2013.01); *A61M 2005/14553* (2013.01); *A61M 2205/14* (2013.01); *A61M 2205/3306* (2013.01); *A61M 2205/3313* (2013.01); *A61M 2205/3317* (2013.01); *A61M 2205/3633* (2013.01); *A61M 2205/587* (2013.01); *A61M 2205/6054* (2013.01); *A61M 2205/6081* (2013.01); *A61M 2205/8206* (2013.01); *A61M 2207/00* (2013.01); *F21V 2200/10* (2015.01)

(58) Field of Classification Search
CPC ...... A61M 5/14; A61M 5/1582; A61M 5/162; A61M 5/172; A61M 2005/1401; A61M 2005/14553; A61M 2205/14; A61M 2205/3306; A61M 2205/3313; A61M 2205/3317; A61M 2205/3633; A61M 2205/587; A61M 2205/6054; A61M 2205/6081; A61M 2205/8206; A61M 2207/00; A61M 2205/584; F21V 33/0068; F21V 2200/10; G02B 6/4442; G02B 6/4482; H05B 45/10; H05B 47/11; A61N 2005/063

See application file for complete search history.

(56) References Cited

U.S. PATENT DOCUMENTS

| | | | |
|---|---|---|---|
| 5,681,285 A | 10/1997 | Ford et al. | |
| 6,059,768 A | 5/2000 | Friedman | |
| 6,695,004 B1 * | 2/2004 | Raybuck | A61M 5/40 137/433 |
| 7,860,583 B2 | 12/2010 | Condurso et al. | |
| 8,679,075 B2 | 3/2014 | Lurvey et al. | |
| 9,308,323 B2 * | 4/2016 | Adams | F21V 33/0068 |
| 9,459,415 B2 * | 10/2016 | Feingold | A61B 1/042 |
| 9,501,619 B2 | 11/2016 | Portnoy et al. | |
| 10,232,107 B2 | 3/2019 | Utz | |
| 12,201,807 B2 * | 1/2025 | Utz | A61M 5/142 |
| 2002/0126286 A1 | 9/2002 | Melnyk | |
| 2007/0106263 A1 | 5/2007 | Ward | |
| 2008/0154187 A1 * | 6/2008 | Krulevitch | A61M 5/14526 604/48 |
| 2010/0006171 A1 | 1/2010 | Tomlin et al. | |
| 2011/0196306 A1 | 8/2011 | De La Huerga | |
| 2011/0264463 A1 | 10/2011 | Kincaid et al. | |
| 2013/0123579 A1 | 5/2013 | Adams et al. | |
| 2015/0314066 A1 * | 11/2015 | Shimizu | A61M 5/16831 604/506 |
| 2016/0161705 A1 * | 6/2016 | Marquardt | G01J 3/0202 356/402 |
| 2016/0175521 A1 | 6/2016 | Adams et al. | |
| 2017/0014023 A1 | 1/2017 | Kern | |
| 2017/0021095 A1 | 1/2017 | Utz | |
| 2017/0023216 A1 | 1/2017 | Utz | |
| 2017/0258983 A1 | 9/2017 | Utz | |
| 2017/0281855 A1 | 10/2017 | Utz | |
| 2017/0340815 A1 | 11/2017 | Utz | |
| 2018/0177938 A1 | 6/2018 | Provost et al. | |
| 2019/0091398 A1 | 3/2019 | Utz | |
| 2020/0098457 A1 * | 3/2020 | Naygauz | G06K 7/1413 |
| 2021/0244835 A1 * | 8/2021 | Push | A61L 2/24 |
| 2021/0255401 A1 * | 8/2021 | Xu | G02B 6/3849 |
| 2021/0318479 A1 * | 10/2021 | Lebhar | G02B 6/0006 |
| 2022/0051792 A1 * | 2/2022 | Burgess | A61M 5/1418 |

FOREIGN PATENT DOCUMENTS

| | | | |
|---|---|---|---|
| EP | 1157711 A2 | 5/2008 | |
| EP | 2009533 A1 | 12/2008 | |
| EP | 4043046 A1 * | 8/2022 | ........ G16H 20/17 |
| JP | 2023-124520 A | 4/2003 | |
| JP | 2004-527853 A | 9/2004 | |
| JP | 2014-533192 A | 12/2014 | |
| JP | 2017-521186 A | 8/2017 | |
| JP | 2020-534956 A | 12/2020 | |
| WO | WO-2012144219 A1 * | 10/2012 | ........ A61M 5/16831 |
| WO | 2019164988 A1 | 8/2019 | |

* cited by examiner

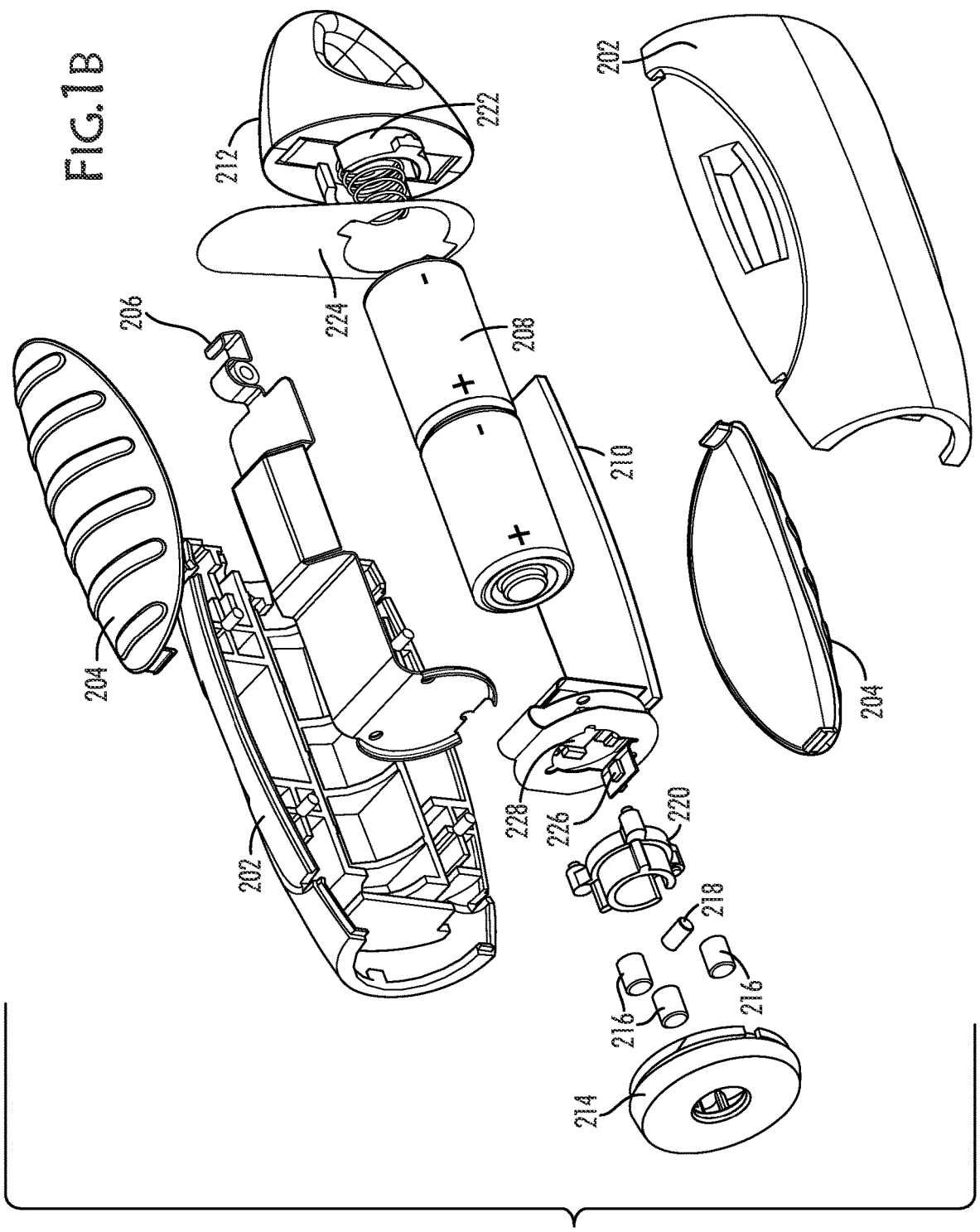

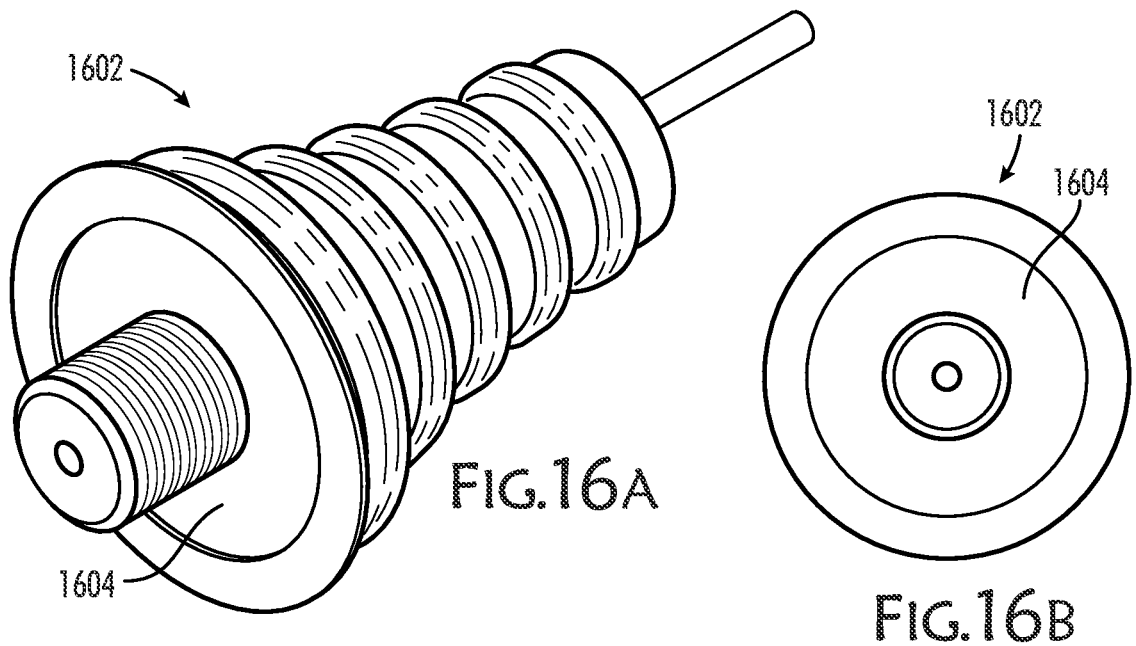
FIG. 16A
FIG. 16B
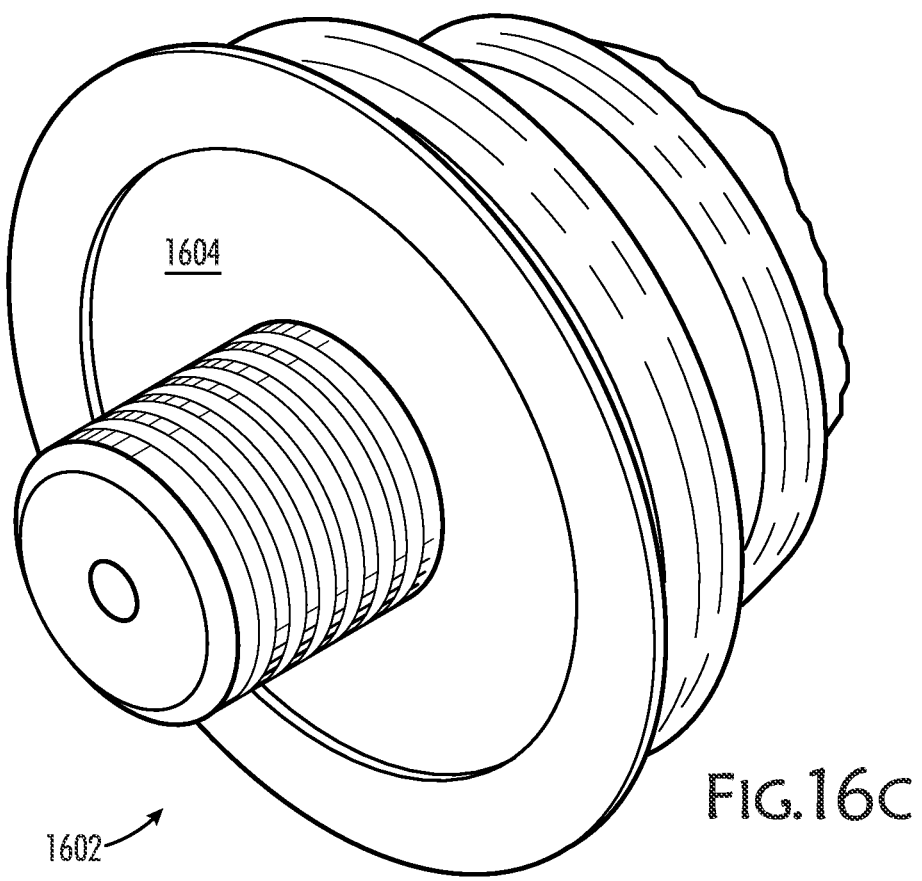
FIG. 16C

MEDICAL INFUSION LINE ELECTRONIC ILLUMINATOR

CROSS-REFERENCE TO RELATED APPLICATIONS

This application is related and claims priority to U.S. Provisional Patent Application No. 63/138,961 entitled "Electronic Illuminator" filed on Jan. 19, 2021. This application is also related to and co-filed with utility applications "Assemblies and Subsystems for Electronic Illuminators", "Systems and Methods for Controlling Microorganism Load with an Electronic Illuminator", "Method and Manufacture of a Dual Lumen Fiber Optic Medical Infusion Line", "Systems and Methods for Authenticating Medical Infusion Lines with an Electronic Illuminator." The entire disclosure of said applications are incorporated herein by reference.

FIELD

The present invention relates to electronic illumination of side emitting fiber optic lines with an electronic illuminator. In particular, an apparatus and system for illumination of side emitting fiber optic lines for medical infusion line intelligence.

BACKGROUND

The present disclosure relates generally to systems, apparatuses, and methods for improving the administration of medical infusion utilizing advanced sensor assemblies and leveraging computational intelligence to improve patient care and reduce practitioner cognitive load. Medical infusion serves to administer medications, fluids, nutrients, solutions, and other materials intravenously to a patient. Patients are often administered medical infusion using intravenous infusion tubing or lines ('IVT'). Such intravenous infusion tubing generally consists of flexible, polymer tubing connected at one end to a fluid source and at another end to a needle or port assembly that provides access to a blood vessel of a patient. It is not uncommon for many infusion tubes, each connected to a different source of fluid (medical infusion pump), to be used simultaneously to deliver several medications at once to a single patient. It is also not uncommon for the needles or port assemblies to be located adjacent to one another, such as multiple adjacent needles, providing access into the brachial vein running through the arm of the patient.

Distinguishing between multiple infusion tubes is a difficult task, and medication delivery error as a result of improperly distinguishing one infusion tube from another is a serious problem in current infusion systems. The confusion of one infusion tube from another is one of the leading causes of preventable medication error. It is potentially life-threatening and is a serious and ongoing concern and cost to medical facilities.

Distinguishing between multiple infusion tubes is a difficult task that is placed in an atmosphere of high stress and rapid timing. The medical industry refers to the atmosphere as placing a high cognitive load on practitioners. This high cognitive load can lead to medication delivery error as a result of improperly distinguishing one medical infusion tube from another. Arguably, the confusion of one medical infusion tube from another is one of the leading causes of preventable medication error. As a result of the difficulties in distinguishing between multiple medical infusion tubes and their associated fluid sources and outputs, as well as the potentially life-threatening possibilities that can occur if incompatible medications are injected through the same medical infusion line; therefore, there is a need for accurate identification of medical infusion tubes. The problem is addressed with an array of sensors, assemblies, processors, physics, and utilizing electrical and computational engineering to improve upon and develop advanced systems of an electronic illuminator and side emitting fiber optics to facilitate illumination, detection, and verification of medical infusion tubes. Further, the systems and methods herein are engineered to improve the usage of an electronic illuminator by providing feedback and reliability into the operation thereof.

SUMMARY

Aspects of systems and apparatuses for medical infusion illumination are disclosed herein. In one aspect a system for medical infusion line illumination is disclosed. The system comprising an electronic illuminator. The electronic illuminator comprising a printed circuit board ('PCB'), a light emitting diode ('LED'), a lens configured with the LED, a power source to supply power to the PCB and LED; and at least one sensory assembly. The LED and lens of the electronic illuminator are configured to a side scattering fiber optic cable. The side scattering fiber optic cable comprises a funnel cap at a proximal end to receive light from the LED through the lens of the electronic illuminator. The side scattering fiber optic cable further comprises a protective end cap at a distal end, wherein the protective end cap is polished on an interior surface to reflect light from the LED of the electronic illuminator. Other embodiments of this aspect include corresponding computer systems, apparatus, and computer programs recorded on one or more computer storage devices, each configured to perform the actions of the methods.

Implementations may include one or more of the following features. The system where the at least one sensor assembly is an ambient light sensor, the ambient light sensor converts light intensity to a digital signal. The at least one sensor assembly is a fiber detection assembly, having a three dimensional magnetic flux density. The fiber detection assembly may include a hall effect sensor. The fiber detection assembly may further include three magnets and a steel bar or pin. The at least one sensor assembly may be an optical power sensor assembly, the optical power sensor assembly detects travel time from the proximal end of the side scattering fiber optic cable to the terminal end of the side scattering fiber optic cable. The at least one sensor assembly may be a cap color detection assembly, where the cap color detection assembly detects color of the fiber funnel cap on the side emitting or side scattering fiber optic cable. The cap color detection assembly may include a photoelectric sensor. The cap color detection assembly may include an R/G/B sensor. The cap color detection assembly may include a color code band detection, where the cap may include a multiple band code or color code. The system may include a housing for the electronic illuminator may include of an external heat sink. The external heat sink is in thermal connection with an internal heat sink. The internal heat sink is in thermal connection with the led. The power source is a battery. The battery is separated from a terminal by split paper. The electronic illuminator further may include a translucent cap or window, the translucent cap is utilized by an ambient light sensor to control the led and forms part of a battery preservation and conservation algorithm. The electronic illuminator may further include a removable end cap with a negative battery terminal. The removable end cap may include an antenna or other communications module as it is further from interference and provides a distinct dead space for an antenna. The fiber funnel cap of the side scattering fiber optic cable is configured with a metal plate. The protective end cap of the side scattering fiber optic cable further may include a one line antenna sensor. Implementations of the described techniques may include hardware, a method or process, or computer software on a computer-accessible medium.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings:

FIG. 1B is an exploded view of an illustration of an example electronic illuminator;

FIGS. 16A-C are illustrations of a fiber funnel cap that is designed to operatively engage with an electronic illuminator or position itself near the lens and LED to transmit light along the side scattering fiber optic line.

DETAILED DESCRIPTION

Figure 1A:
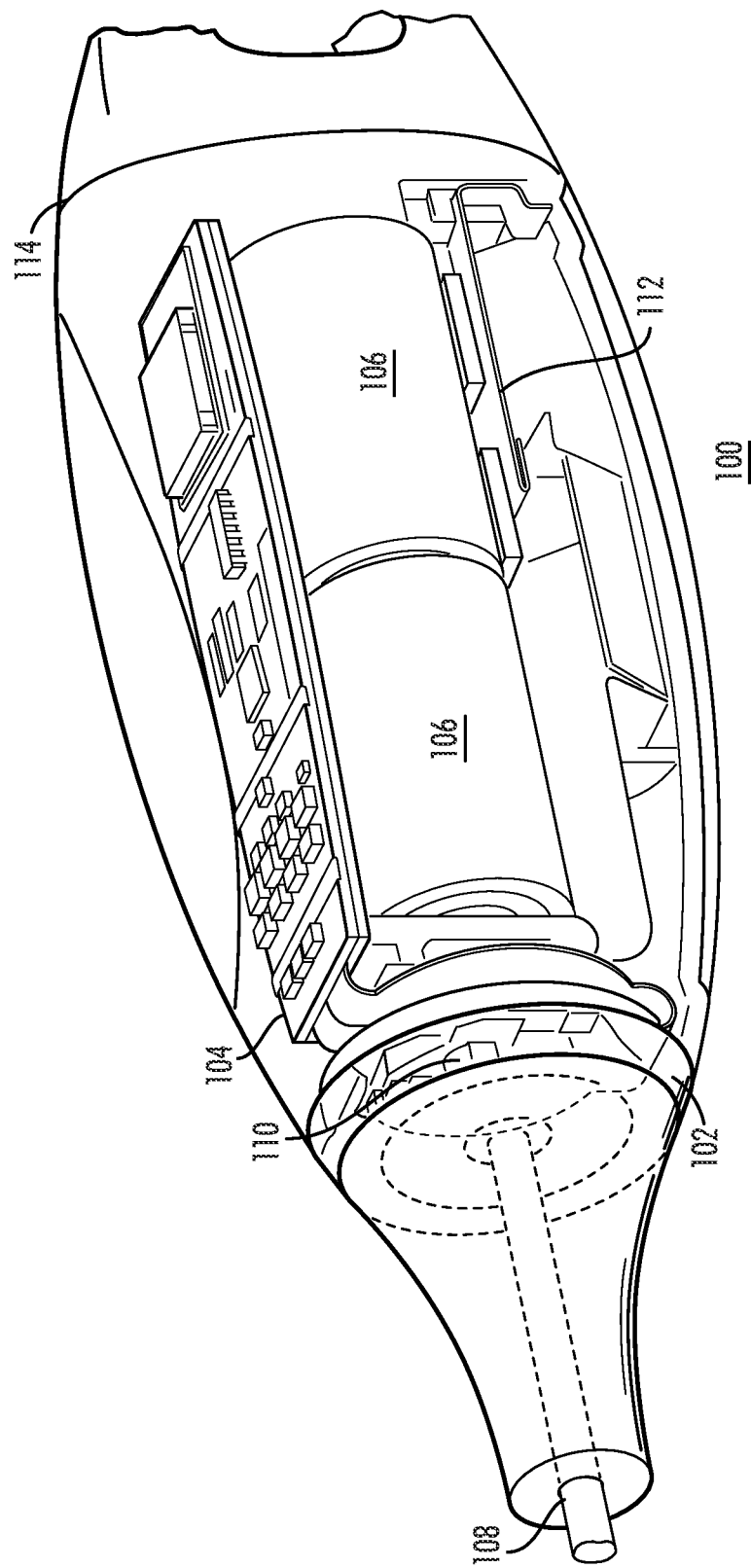
FIG. 1A is perspective view of an illustration of an example electronic illuminator, displaying the configuration of internal components and subsystems.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Throughout this specification and the claims, the terms "fiber optic cable," "fiber optic line," and "fiber optic" are used to mean a side scattering or side emitting or side glow fiber optic cable, wherein light or illumination is purposefully emitted as it traverses the length of the cable or line.

Throughout this specification and the claims, the terms "comprise," "comprises," and "comprising" are used in a non-exclusive sense, except where the context requires otherwise. Likewise, the term "includes" and its grammatical variants are intended to be non-limiting, such that recitation of items in a list is not to the exclusion of other like items that can be substituted or added to the listed items.

I. Example Use Case Scenarios

Medical infusion typically serves to administer medications, fluids, nutrients, solutions, and other materials intravenously to a patient. Patients are often administered medical infusion using intravenous infusion lines. Such intravenous infusion lines generally consist of flexible, plastic tubing connected at one end to a fluid source and at another end to a needle or port that provides access to a blood vessel of a patient. It is not uncommon for many infusion lines, each connected to a different source of fluid (medical infusion pump), to be used simultaneously to deliver several medications at once to a single patient. It is also not uncommon for the needles or ports to be located adjacent one another, such as multiple adjacent needles providing access into the brachial vein running through the arm of the patient.

Distinguishing between multiple infusion lines is a difficult task that is placed in an atmosphere of high stress and rapid timing. The medical industry refers to the atmosphere as placing a high cognitive load on practitioners. This high cognitive load can lead to medication delivery error as a result of improperly distinguishing one medical infusion line from another. Arguably, the confusion of one medical infusion line from another is one of the leading causes of preventable medication error. As a result of the difficulties in distinguishing between multiple medical infusion lines and their associated fluid sources and outputs, as well as the potentially life-threatening possibilities that can occur if incompatible medications are injected through the same medical infusion line, there is a need for accurate identification of medical infusion lines.

Similarly, the disclosure herein may also be applied to many other environments where a cognitive load, or otherwise environment restrictions, may place a burden on traditional techniques. For example, tracing of lines within the Information Technology ('IT') field may enable rapid detection and identification. In other aspects, the disclosed embodiments may be useful for the energy sector, where illumination needs may be utilized to send signals through long distances and to have a system that may rapidly deploy and integrate with little additional cost. Therefore, there is a need to improve electronic illuminators with a more advanced sensor system, and provide on board intelligence that allows multi-functional use and adaptability.

II. Systems and Methods

In one aspect, the LED is configured to the electronic illuminator and is controlled through a printed circuit board ('PCB'). In the example of FIG. 1A, the PCB is a Rigid-Flex PCB ('RF-PCB') (herein also referred to generally as a 'PCB') wherein part of the board is rigid and the other part is defined within a flexible ribbon, thus allowing for applications such as within the electronic illuminator housing as disclosed herein. The electronic illuminator is configured to illuminate a fiber optic cable having a proximal end with a cap and a terminal end that terminates in a reflective cap. The fiber optic may be side glow or fuzzy fiber optic cable that allows light to emanate or leak to the outside, causing a glow or luminescence.

The electronic illuminator, in one aspect, comprises a housing, along with a rigid-flex PCB or RF-PCB or PCB, and a power source. The housing may be comprised of a polymeric material and have various metal or other heat transferring locations, effectively forming external heat sinks within the housing that connects to an internal heat sink. Further, in other aspects, the housing may be comprised of metal or a blend of polymeric material and a metal, thus forming a protective enclosure for the various assemblies and subsystems. In one aspect the housing allows the electronic illuminator to be water tight or dust proof, and in other aspects it may be rated for waterproofing for a certain period of time at specific atmospheric pressure. Rubber gaskets may align the surfaces of the housing, as well as rubber material for grip, such as textured rubber where a user may come into contact with the electronic illuminators housing. The rubber gaskets assist in water proofing, vibration, dust proofing, and may further attribute to ingress protection, allowing some examples to achieve ratings such as IP65, IP66, and IP67.

Returning to the RF-PCB, in one example it may be configured with an ambient light sensor that is operatively configured within the housing of the electronic illuminator. The ambient light sensor may be any number of makes or models, for example, it may be a sensor manufactured by Lite-On™, such as the LTR-329ALS-01. In one aspect, the flexible region of the RF-PCB allows for adjusting and aligning the ambient light sensor to offset from the LED, therefore allowing for detection of whether or not the LED is powered, along with the LED's relative intensity, and detection of environmental lux. These features incorporated with the onboard microcontroller allow for automatic light intensity configuration through the power drivers on the RF-PCB. In another aspect the ambient light sensor converts light intensity to a digital signal, such as lux, thought an analog to digital converter on the sensor, and transmits the lux value to a microcontroller. In another aspect the conversion is processed on a microcontroller on the RF-PCB, and further used to determine behavior of an electronic illuminator. Even further embodiments, the processing may occur on a microprocessor, wherein the microprocessor may be standalone, or it may be incorporated onto the microcontroller unit.

In one aspect, a sensory system for an electronic illuminator to detect the presence and color of a fiber optic cable cap or funnel cap is disclosed. A sensory system comprises various components, assemblies, and configurations disclosed herein. In one example a sensory system is configured to a light source, such as a light emitting diode ('LED'). An LED is typically comprised of a silicon lens, a ceramic substrate, a thermal pad, a bond layer, an LED chip or microprocessor, a phosphorous layer, and a cathode. The entire construction is typically within a few millimeter package. Typically, several LED chips are packaged together to provide enough luminous flux to serve the purpose of illuminating.

In another aspect, an electronic illuminator is configured with a fiber detection assembly. Wherein the fiber detection assembly is a hall effect sensor or hall sensor. The assembly may be comprised of a plurality of magnets and a steel bar to create a tuned magnetic field, so as to resemble a key or signature that allows detection of fiber insertion into the electronic illuminator. The key or signature may be unique to a fiber line, to a color, or may be coded for other intelligence. The fiber detection assembly further having a three dimensional magnetic flux density based on at least one or more magnets configured to a fiber funnel cap.

In additional aspects, a cap color detection assembly is incorporated onto the RF-PCB of an electronic illuminator. Wherein the cap color detection assembly detects the color of the cap, or a funnel cap, or other design enabled to configure into or on an electronic illuminator to direct light along the fiber optic cable. The cap color detection assembly, in one aspect, may be comprised of an R/G/B sensor, a light emitting component and an integrated circuit or microprocessor. In further aspects, the cap color detection assembly may be positioned towards the light emitting diode, so as to receive the light radiation directly. Additionally, a cap color detection assembly may comprise a color code band detection, wherein the cap comprises a multiple band color code and the cap color detection assembly is capable of scanning the multiple band code and returning instructions, such as the color the band is coded for or additionally, whether the code also instructs things such as sound, illuminance patterns, or other system alerts.

In additional aspects, an ambient light sensor, a fiber detection assembly, and a cap color detection assembly are operatively configured to the RF-PCB, also referred to generally as a PCB, in the electronic illuminator. The three subsystems work in coordination, and may rely on one another, for example, the ambient light sensor may work in coordination with the fiber detection assembly to determine if a fiber optic cable is present, or if it has illumination running through it. Such procedures may be used to detect a failure in the fitting of the fiber optic line, or may also detect unauthentic, or not genuine configurations.

Referring now to additional aspects of the electronic illuminator. In one aspect the housing may further be comprised of a heat sink. The heat sink may be metal based or based from other heat transferable materials that allow the dissipation of heat energy from the LED, the power drivers, the microcontroller, and the various microprocessors onboard an example electronic illuminator system. Furthermore, the heat sink may be aligned with the power source, such as a battery. The battery may comprise any number of chemistries that are available to provide durational power support for the electronic illuminator.

Referring to methods herein, in one aspect a method for detecting the presence of a fiber optic line or cable in an electronic illuminator is disclosed. In one aspect, the method comprises provisioning an electronic illuminator with an ambient light sensor and a fiber detection assembly. Wherein the ambient light sensor is configured to receive light from outside of the electronic illuminator, thus in one configuration on the back side of the RF-PCB, allows for diffused environmental light to be acquired through a translucent ring or window on the exterior housing of the electronic illuminator. Next, the ambient light sensor or microcontroller unit acquires the light intensity and coverts it to a digital signal (lux). Next, the MCU determines the lux based on the digital signal. Then the hall effect sensor on the fiber detection assembly acquires a magnetic flux density. The MCU then determines a tesla value based on the magnetic flux density. Through the hall effect sensor and the ambient light sensor, the presence of a fiber optic cable may be detected with a digital signal and tesla value, or may be detected independently by either assembly or sensor. Further, when acquiring a magnetic flux density through the hall effect sensor on the fiber detection assembly, the strength of the magnetic flux may be represented based on output voltage. Lastly, the example aspect discloses alerting, by the electronic illuminator, that a fiber optic cable is present. Further, the electronic illuminator may use the subsystem for authenticating that the fiber optic cable is authentic for use with the electronic illuminator based on tesla value alone or in combination with cap color detection assembly.

The embodiments herein may also be incorporated into a housing of a medical infusion pump. For example, the various components, apparatus, and system may be incorporated into a medical infusion pump, whereas the housing becomes the medical infusion pump housing. Further, the heat sinks may be incorporated, or with the additional space afforded by the medical infusion pump, they may be removed all together. The following reference to figures are embodiments, any of which may include a medical infusion pump, wherein the MCU is a processor onboard the medical infusion pump.

In some aspects systems and methods for power management are disclosed. In one aspect power management within the electronic illuminator is handled by the MCU, wherein the optical detection assembly, the cap color detection assembly, and the fiber detection assembly work to provide power savings. In one aspect, the ambient light sensor

III. With Reference to Figures

Referring now to FIG. 1A, a perspective view of an illustration of an example electronic illuminator, displaying internal components and subsystems. In the example, an electronic illuminator 100 is disclosed with a fiber funnel cap that may also be referred to as a fiber cap or funnel cap. The fiber funnel cap, in the example, may be of a specific color, wherein when inserted into the receiving unit of the electronic illuminator 100, the color is detected and the electronic illuminator 100 is set to illuminate the LED driver corresponding to cap color. This feature reduces cognitive load as it is intuitive, wherein a red cap will configure the electronic illuminator 100, through an MCU, to display a red light down the fiber optic line 108. In this example, the fiber optic line 108 being a side emitting or side scattering fiber optic line, or one with poor transmission that allows light filter outside of the directionality of the line.

Continuing, in the example, a RF-PCB 104 is disclosed, wherein the flex portion is folded unto itself, forming a location for the R/G/B sensor of a cap color detection system. The folds allow for blocking of the ambient light sensor from the onboard LED of the electronic illuminator, wherein the ambient light sensor acquires environmental lux from the clear housing, also referred to as a translucent ring 102, at the proximal end of the electronic illuminator 100. In other aspects the translucent ring 102 may be opaque or may have a window in it that allows for environmental light. In further embodiments the light from the side emitting fiber optic line may be used to determine environmental lux. Additionally, the magnets supplied for the hall effect sensor forming the fiber detection assembly are embedded within the translucent ring 102, or positioned near the translucent ring 102, to form a magnetic field.

A battery 106 is disclosed along with an internal heat sink 112, wherein the battery powers the electronic illuminator's various assemblies and the internal heat sink 112 works to dissipate heat to the external heat sink on the housing. An LED assembly 110 is positioned to connect with the fiber funnel cap to project light through the side emitting fiber optic line 108. An end cap 114 to the electronic illuminator holds the batteries in place and may further house a communications module or assembly as well as an antenna. With regard to the battery 106, the electronic illuminator, in one aspect, may work in coordination with the ambient light sensor and the cap color detection assembly or the fiber detection assembly to regulate usage of power and to form a swarm of sensors for intelligent power management. In one aspect, the ambient light sensor detects lux in the environment and controls LED power output from the power driver to conserve energy. Further, the cap color detection assembly may detect the fiber funnel cap is not engaged and thus automatically turn the system off. Similarly, the fiber detection assembly may detect an absence of a fiber and a fiber funnel cap, therefore turning the power off until the fiber funnel cap is attached.

Referring now to FIG. 1B, an exploded view of an illustration of an example electronic illuminator. In the example a housing 202 has locations for an external heat sink 204, wherein the external heat sink 204 is in thermal connection with an internal heat sink 206. The internal heat sink 206 is designed to contact equipment such as the LED power drivers, the LED, and other integrated circuits or microcontrollers, including processing units, so as to reduce heat build-up and control thermals within the tight enclosure. The housing of the example electronic illuminator is further configured with an end cap 212, the end cap having a negative terminal 222. The end cap 212 secures the batteries in place and allows for rapid exchange of batteries. In the example, the end cap 212 has split paper 224 to separate the contact of the batteries and allow for an extended shelf life of the electronic illuminator. Additionally, a translucent ring 214 forms the proximal end or end nearest the fiber optic line, wherein the translucent ring 214 allows light to reach an ambient light sensor Similarly, in additional embodiments a window to the environment may be provided, wherein the translucent ring is opaque or not translucent and a window within the ring may allow for observing the lux within the environment.

Various examples disclosed herein contain reference to the electronic illuminator, and are identified in FIG. 1B. In one aspect the illuminator is housed within a front shell and a back shell, also referred to as a housing 202. The housing is often made of a polymer but can be made of other materials such as a metal casing. The housing of the electronic illuminator serves to protect the assemblies, sensors, and controllers, as well as provide positioning of said components, and account for size, durability, and ease of transmission of RF signals. An electronic illuminator end cap 212 secures a lithium ion or other battery in place within the shell or housing 202 of the electronic illuminator. The end cap 212 is equipped to receive a piece of split paper 224 to break the current and allow for longer shelf life and storage of the electronic illuminator. In additional aspects an internal heat sink 206, which is integrated along the PCB 210 and/or microcontroller and battery supply or batteries, the internal heat sink 206 is then connected through a high thermal conductive material to the metal side covers, or external heat sinks 204 to further dissipate heat. In other aspects the metal side cover is fully formed to the internals of the electronic illuminator and provides a passive environmental cooling complex.

In another aspect of the example of FIG. 1B, power is supplied from a plurality of batteries 208, which may be of lithium chemistry, or other chemistry, to allow for powering an electronic illuminator. Additionally, the electronic illuminator's batteries 208 may be charged wirelessly or through a uniform serial bus connection such as a USB-A, USB-B, USB-C, or any micro variants thereof. The RF-PCB 210, also known herein as a PCB, contains a microcontroller, along with the various assemblies and sensors. The RF-PCB 210 forms a folded structure to allow for unique positioning of sensors and assemblies so as to allow for optimal operation. In one aspect, the ambient light sensor is formed to the backside of the RF-PCB 210, so that ambient light from the environment, penetrating through the translucent ring 214 is the only perceived light. This allows for automatic adjustment by the MCU for controlling light intensity. For example, if the surrounding environment is dark, the amount of lux produced by the LED can be lower, as the overall system needs do not require a high lux operation, thus conserving battery life and equipment from excess heat and usage.

The LED assembly 228 on the RF-PCB 210 is configured with a lens 220, wherein the lens 220 is situated to receive the fiber for illumination. The fiber side, in one aspect, is equipped with a fiber funnel cap, that configures to the translucent ring 214 and is held in place by a locking mechanism or through magnetic force and use of magnets, such as a magnet assembly 216, or other configurations of magnets. The R/G/B sensor 226, comprising the cap color detection assembly, is disclosed facing inwards toward the receiving orifice of the fiber funnel cap. Additionally, the magnet assembly 216, in coordination with the steel bar 218 provides a magnetic flux key or signature that may be utilized for fiber detection, as well as authentication and security. Wherein the electronic illuminator may be configured to authorize use of a signature or flux key.

Figure 2:
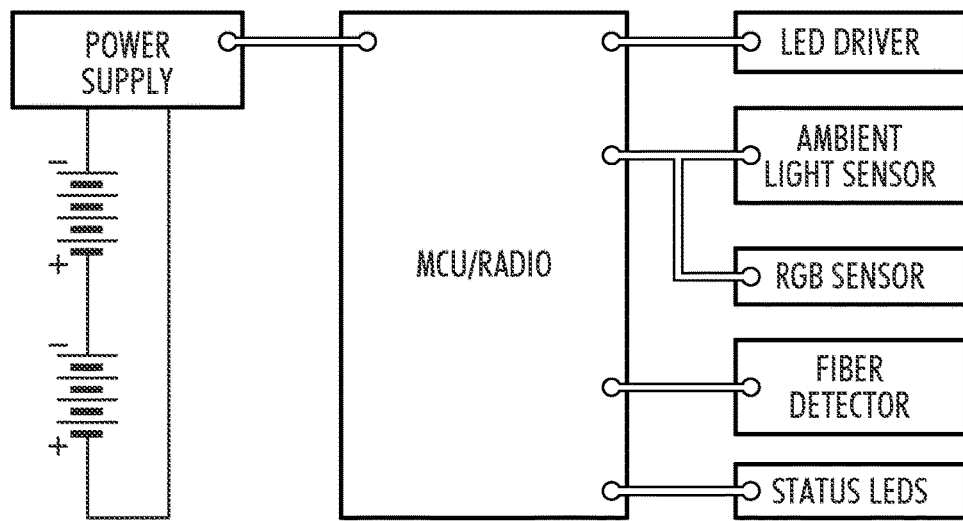
FIG. 2 is a schematic diagram of an example of an electronic illuminator's internal components and subsystems.

Referring now to FIG. 2, a schematic diagram of an example of an electronic illuminator's internal components and subsystems. In one aspect a microcontroller unit or MCU is configured to a power supply such as a battery or may be directly powered through a USB connection to a power source external to the device. Similarly, the power supply may be adapted to receiving power wirelessly through such standards as Qi charging. The schematic of FIG. 2 is an overall generalization of an example of an electronic illuminator, including components such as an LED driver, ambient light sensor R/G/B sensor (which forms a cap color detection assembly), a fiber detection assembly (based in part on a hall sensor), status LED's, and a power supply.

The various components, assemblies, sensors, and subsystems may be in communication utilizing an inter-integrated circuit ('I²C') interface for intra-board communication. Additional communications protocols such as wireless, Bluetooth™, and other radio standards may be additional chipsets configured with the onboard MCU.

Figure 3:
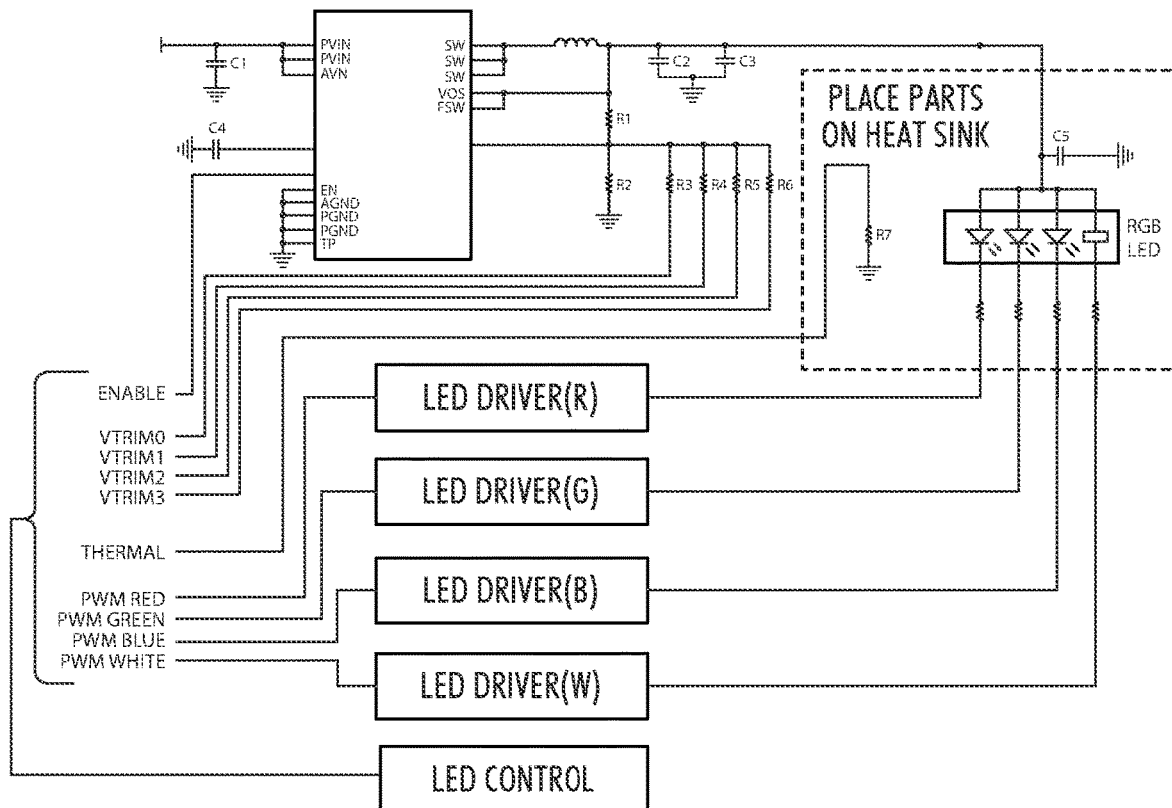
FIG. 3 is a schematic diagram of an example of an electronic illuminator's LED power system drivers.

Turning now to FIG. 3, a schematic diagram of an example of an electronic illuminator's LED power system drivers. In one aspect the power drivers illuminate LED's for varying color frequency. In the disclosed example, a red, green, blue, and white driver powers the various aspects of color. Due to heat or radiance or thermals from the drivers powering the LED components, a heat sink may be applied, such as the one disclosed in FIG. 1B, wherein the heat is diffused along an electronic illuminator, and dispersed exterior thereof through a heat sink mounted externally. Thus, the present embodiment is an internal metallic heat sink in thermal communication with an external facing metallic heat sink. Additional configurations of the LED drivers, as well as LED powering assembly and the chipset are disclosed herein.

Figure 4:
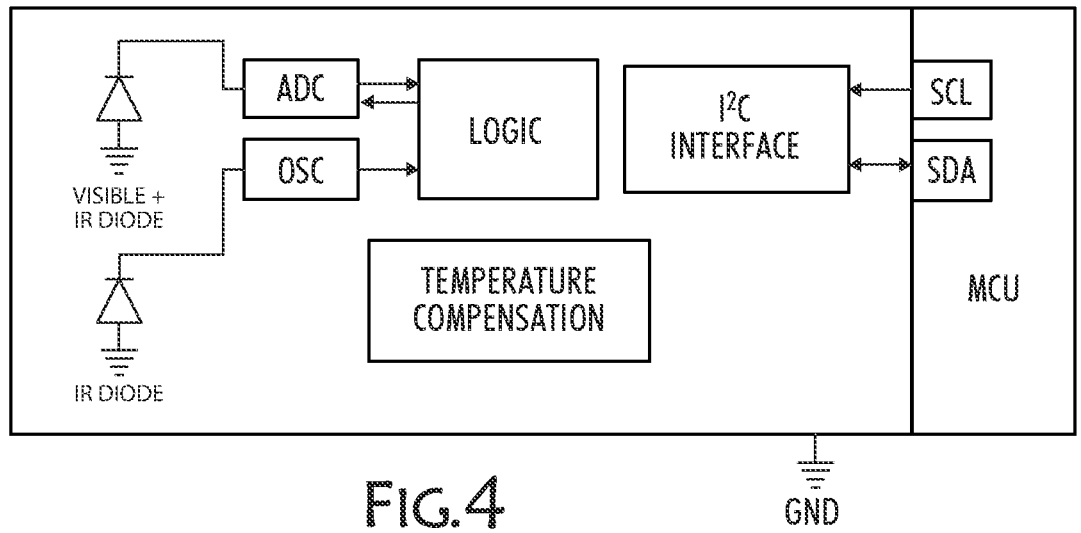
FIG. 4 is a block diagram of an example of an electronic illuminator's ambient light sensor.

Referring now to FIG. 4, a block diagram of an example of an electronic illuminator's ambient light sensor. In one example the ambient light sensor converts light intensity to a digital output signal capable of direct inter-integrated circuit—I²C. With reference to FIG. 4, the Analog to Digital Converter ('ADC'), is configured to the visible IR diode and IR diode, wherein the logic is responsible for converting. Continuing, in the example, the I²C interface is displayed in connection with the Serial Clock ('SLC') and serial data. Thereby, I²C being a synchronous, multi-controller, multi-target, packet switched, single-ended serial communications bus. I²C uses only two bidirectional open collector or open drain lines, serial data line and serial clock line, pulled up with resistors. Typical voltages used are +5 V or +3.3 V, although other voltages are common.

In the example of FIG. 4, within operating temperatures within a range of 30° Celsius to 70° Celsius, the example ambient light sensor may perceive 6 dynamic ranges from 0.01 lux to 64,000 lux, and automatically reject 50/60 Hz lightings flicker. Thus, in the example surface mount package, the ambient sensor converts light intensity to a digital output signal that is capable of direct I²C interface with an MCU.

Figure 5:
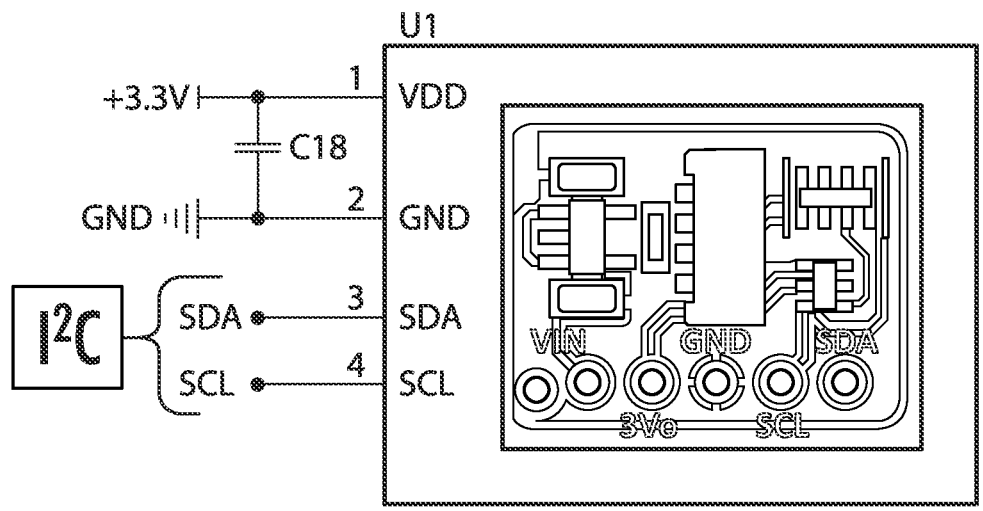
FIG. 5 is a schematic diagram of an example of an electronic illuminator's ambient light sensor chipset.

Turning now to FIG. 5, a schematic diagram of an example of an electronic illuminator's ambient light sensor chipset. There are three main types of ambient light sensors, namely, photodiodes, photonic ICs, and phototransistors. In principle they work along the same lines of converting light to voltage or current, and using the voltage or current for modes of operation. Typically, light enters the photodiode, wherein a thin layer allows photons to pass through it into a depletion region where a pair of electron holes are formed. The electric field across the depletion region causes electrons to be swept into an N layer. In some aspects, the ambient light sensor provides linear response over a wide dynamic range from 0.01 lux to 64,000 lux. The lux (symbol: lx) is the SI derived unit of illuminance, measuring luminous flux per unit area. It is equal to one lumen per square meter. In photometry, this is used as a measure of the intensity, as perceived by the human eye, of light that hits or passes through a surface.

Illuminance is analogous to the radiometric unit watt per square meter, but with the power at each wavelength weighted according to the luminosity function, a standardized model of human visual brightness perception. Illuminance is a measure of how much luminous flux is spread over a given area. One can think of luminous flux (measured in lumens) as a measure of the total "amount" of visible light present, and the illuminance as a measure of the intensity of illumination on a surface. A given amount of light will illuminate a surface more dimly if it is spread over a larger area, so illuminance is inversely proportional to area when the luminous flux is held constant.

The illuminance provided by a light source on a surface perpendicular to the direction to the source is a measure of the strength of that source as perceived from that location. Like all photometric units, the lux has a corresponding "radiometric" unit. The difference between any photometric unit and its corresponding radiometric unit is that radiometric units are based on physical power, with all wavelengths being weighted equally, while photometric units take into account the fact that the human eye's image-forming visual system is more sensitive to some wavelengths than others, and accordingly every wavelength is given a different weight. The weighting factor is known as the luminosity function.

The lux is one lumen per square meter (lm/m 2), and the corresponding radiometric unit, which measures irradiance, is the watt per square meter (W/m 2). There is no single conversion factor between lux and W/m 2. There exists a different conversion factor for every wavelength, and it is not possible to make a conversion unless one knows the spectral composition of the light. The peak of the luminosity function is at 555 nm (green); the eye's image-forming visual system is more sensitive to light of this wavelength than any other. For monochromatic light of this wavelength, the amount of illuminance for a given amount of irradiance is maximum: 683.002 lux per 1 W/m 2; the irradiance needed to make 1 lux at this wavelength is about 1.464 mW/m 2. Other wavelengths of visible light produce fewer lux per watt-per-meter-squared. The luminosity function falls to zero for wavelengths outside the visible spectrum.

For a light source with mixed wavelengths, the number of lumens per watt can be calculated by means of the luminosity function. In order to appear reasonably "white", a light source cannot consist solely of the green light to which the eye's image-forming visual photoreceptors are most sensitive, but must include a generous mixture of red and blue wavelengths, to which they are much less sensitive.

This means that white (or whitish) light sources produce far fewer lumens per watt than the theoretical maximum of 683.002 lm/W. The ratio between the actual number of lumens per watt and the theoretical maximum is expressed as a percentage known as the luminous efficiency. For example, a typical incandescent light bulb has a luminous efficiency of only about 2%. In reality, individual eyes vary slightly in their luminosity functions. However, photometric units are precisely defined and precisely measurable. They are based on an agreed-upon standard luminosity function based on measurements of the spectral characteristics of image-forming visual photoreception in many individual human eyes.

In the example of FIG. 5, an ambient light sensor, configured as an ambient light sensor subsystem is integrated into the rigid-flex printed circuit board. By integrating the ambient light sensor, the electronic illuminator possesses the ability to visualize or detect the connection of the fiber feed by determining environmental lux, and the change in lux once the fiber is configured. An increase of lux within the housing, without an increase in the lux externally to the electronic illuminator may single that the onboard LED is active, but transmission through the fiber optic cable is not occurring. Similarly, with ambient lux increased, from powering on of the LED drivers, it may signal that the electronic illuminator is operating as intended.

In other aspects, there exists a translucent ring at the proximal location of the illuminator to detect the ambient light difference from that of the LED's of the electronic illuminator. In one aspect, the ambient light sensor is placed on a flexible region of a RF-PCB in a location that is shaded from luminance of the fiber source. If the ambient light sensor detects ambient light with no fiber attached it can switch the microcontroller into low power mode. The ambient light sensor, in other aspects, assists with power control and sleep wake. In other aspects, the ambient light sensor detects errors within the LED or within the electronic illuminator. The ambient light sensor, in additional embodiments is equipped to detect occlusion of the signal of the electronic illuminator and to alert or otherwise inform users of an issue with the electronic illumination system.

Figure 6:
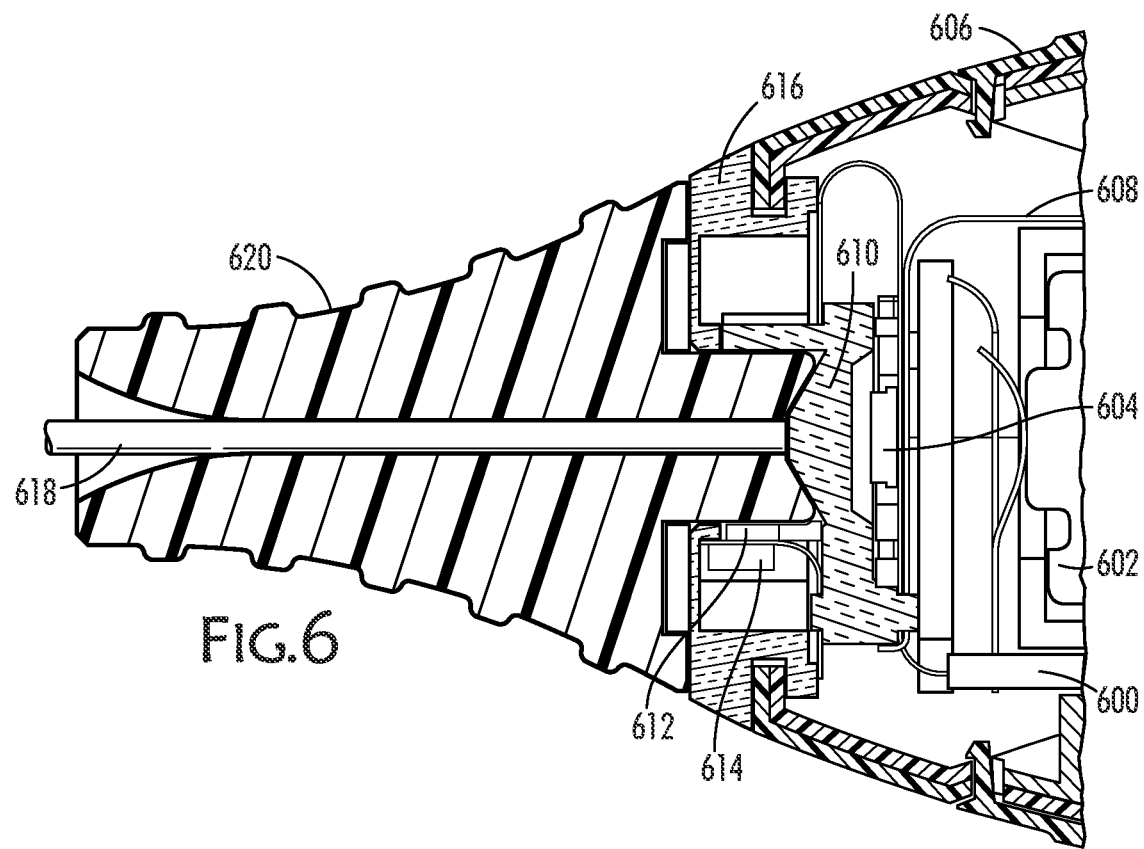
FIG. 6 is an illustration of an example of an electronic illuminator in cross section, disclosing the ambient light sensor configuration within the electronic illuminator.

Referring now to FIG. 6, an illustration of an example of an electronic illuminator in cross section, disclosing the ambient light sensor configuration within the electronic illuminator. In the example, the ambient light sensor is configured in a region shaded from the LED 604 of the electronic illuminator. The ambient light sensor 614 is directed to receive lux or light from the environment through the translucent ring 616. In additional embodiments, the translucent ring 616 may have a filter to shade certain lux ranges so as to enable optimal performance. In other embodiments the translucent ring 616 may be non-translucent and have a window to the exterior for accumulating environmental lux as part of a power savings algorithm and automatic adjustment of LED power. For example, if the ambient light sensor 614 detects ambient light with no fiber attached it can switch the microcontroller or MCU into low power mode by communicating across the PCB 600. The ambient light sensor 614, in other aspects, assists with power control and sleep wake functionality, as well as instructing with other assemblies the proper usage by identifying whether or not the luminosity is enough to impact the environmental lux. When the power source is a battery 602, the algorithm may have conservative parameters versus connected directly to a power source such as a wall outlet. In other aspects, the ambient light sensor detects errors within the LED or within the electronic illuminator by detecting no light is emitting through the lens 610. The ambient light sensor, in additional embodiments, is equipped to detect occlusion of the signal of the electronic illuminator and to alert or otherwise inform users of an issue with the electronic illumination system.

Continuing, in FIG. 6, the R/G/B sensor 612 forming the cap color detection assembly is facing towards the receiving orifice of the fiber 618 and fiber funnel cap 620. The R/G/B sensor being equipped to read the outer surface of the inserted portion of the fiber funnel cap 620. Further, the R/G/B sensor is able to detect the color of the fiber funnel cap 620 for instructing the MCU to power LED drivers for a specific color or for other computational routines. The assemblies mentioned herein may generate heat, the internal heat sink 608 is positioned across those components and in thermal communication with the external heat sink 606 that in this example forms part of the housing of the electronic illuminator.

Figure 7:
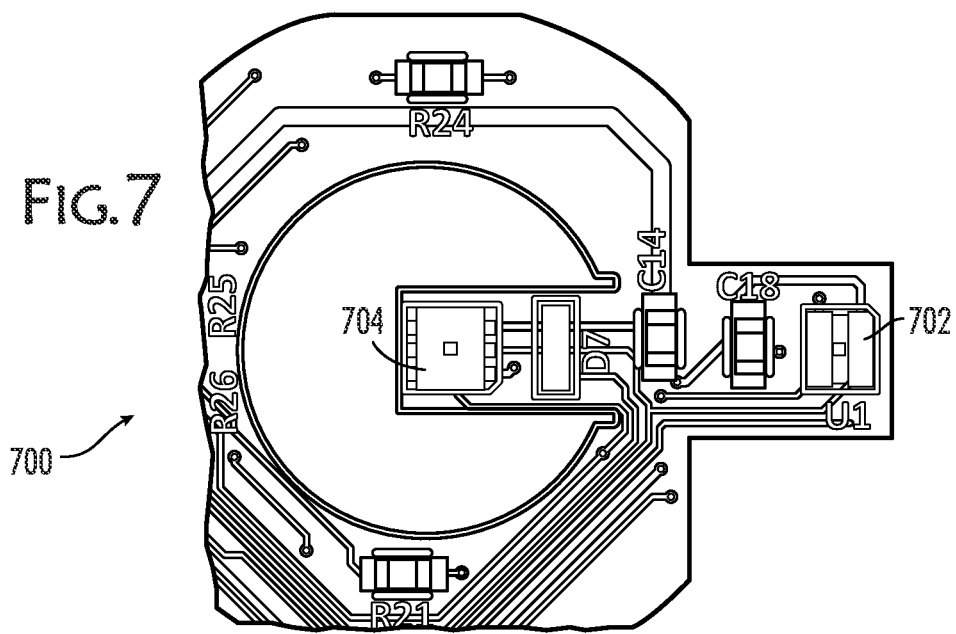
FIG. 7 is an illustration of an example of an electronic illuminator's Rigid-Flex PCB, wherein the flex portion is disclosed with the ambient light sensor and the cap color detection assembly.

Referring now to FIG. 7, an illustration of an example of an electronic illuminator's Rigid-Flex PCB 700, wherein the flex portion is disclosed with the ambient light sensor 702 and the cap color detection assembly configured with an R/G/B sensor 704. The cap color detection assembly having the capability to read the cap color of a fiber funnel cap, to program the LED power drivers to illuminate a specific range of LED light to match the fiber funnel cap. In one aspect, the RGB sensor may be color light sensing with an IR blocking filter and with high sensitivity. Example manufacturers include Misumi™, Excelitas™, ams™, and include low power options with high sensitivity.

Examples of Benefits and Features for an R/G/B Sensor are disclosed in the table below:

| R/G/B Sensor | |
| --- | --- |
| Benefits | Features |
| Enables accurate color and light sensing measurements under varying lighting conditions by minimizing IR and UV spectral component effects | Red, Green, Blue (RGB), and Clear Light Sensing with IR blocking filter Programmable analog gain and integration time 3,800,000:1 dynamic range Very high sensitivity |
| Programmable interrupt pin enables level-style interrupts when pre-set values are exceeded, thus reducing companion microprocessor overhead | Maskable interrupt Programmable upper and lower thresholds with persistence filter |
| Enabling a low-power wait-state between RGBC measurements to reduce average power consumption | Power management Low power - 2.5 µA sleep state 65 µA wait state with programmable wait state time from 2.4 ms to >7 seconds |
| Digital interfaces are less susceptible to noise | I²C fast mode compatible interface Data rates up to 400 kbit/s Input voltage levels compatible with VDD or 1.8 VBUS |

In one aspect, an R/G/B sensor, as part of the cap color detection assembly is configured to read a multiple band code, wherein the bands may be coded or preprogrammed within the MCU to illuminate at a specific spectrum, such as to produce a specific color of light. The multiple band code may be transcribed as rings on a fiber funnel cap or along the fiber line, that when engaged with the electronic illuminator allows reading of the multiple band code and transmission from the cap color detection assembly to an MCU for signaling or communicating to the LED power drivers. In other aspects, a coded SKU may be read by the cap color detection assembly and similarly transmitted to the LED power drivers.

Figure 8:
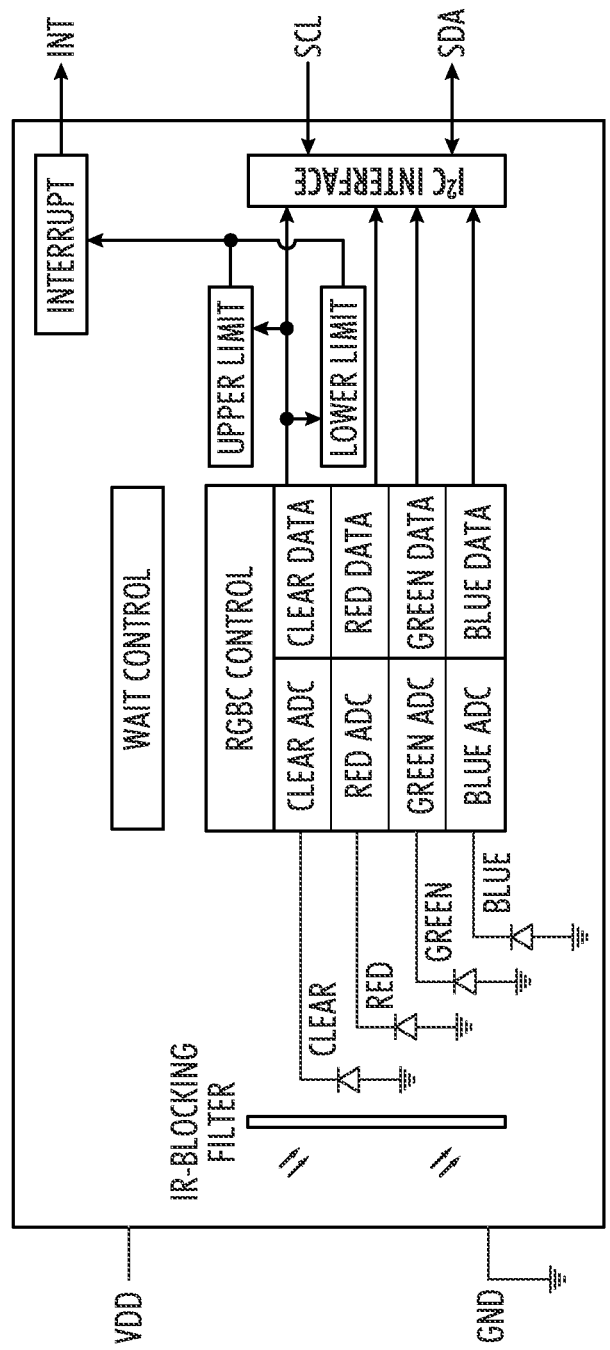
FIG. 8 is a block diagram of an example of an electronic illuminator's cap color detection assembly.

Referring now to FIG. 8, a block diagram of an example of an electronic illuminator's R/G/B sensor forming a cap color detection assembly. In the block diagram, the R/G/B control stack shows the architecture of the integrated circuit. Further, the R/G/B sensor is in interface communication with an MCU on a RF-PCB. The configuration is one of many, other examples may include additional components or configurations. For example, a multiple band code reader may contain additional elements.

In one aspect, a cap color assembly utilizes an R/G/B sensor to identify the cap color, wherein once acquired, communicates with an MCU which in turn instructed LED power drivers to illuminate for the specific color. In other aspects, a cap color detection assembly may be coded to specific instructions, such as to illuminate with a pattern, or to indicate expected luminosity outside of the ambient light sensor, to play an audio signal, or other cognitive aspect such as identifying with medical fluid treatment. In one aspect, a red cap or red band pattern may be programmed for blood products, or blood infusion. Whereas a green cap or green band pattern may be programmed for nutrients, and blue for saline, these are but a few possibilities with the systems and methods disclosed herein.

Figure 9:
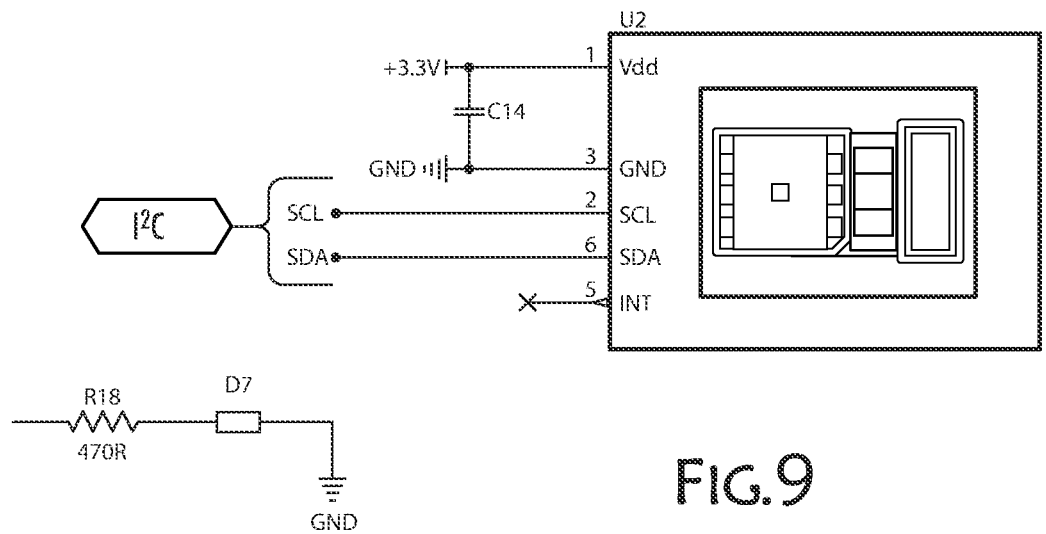
FIG. 9 is a schematic diagram of an example of an electronic illuminator's R/G/B sensor forming a part of the cap color detection assembly.

Referring now to FIG. 9, a schematic diagram of an example of an electronic illuminator's R/G/B sensor forming a part of the cap color detection assembly. In the example of FIG. 9, a schematic for one embodiment of an R/G/B sensor is disclosed. The MCU on the RF-PCB in communication through the I²C interface. In one aspect the cap color detection sensor minimizes IR and UV spectral component to produce accurate color measurements. In another aspect the cap color detection detects the cap color of the fiber funnel cap on the side scattering fiber optic line. In other aspects the cap color detection assembly detects the color of the fiber funnel cap and registers the color with the microcontroller or MCU. In this example, the microcontroller determines what color the fiber funnel cap consists of and signals to the LED driver to illuminate the side scattering fiber optic line with the specific color. The cap color detection assembly is enabled to scan for accurate color under varying conditions, ranging from ICU room lighting to patient care and resting state lighting. Furthermore, the fiber funnel cap color may serve as a watermark, proprietary colors may be selected, and or techniques of encoding the fiber funnel caps with color properties for counterfeiting prevention and authentication. Furthermore, the cap color detection assembly is capable of SKU identification, identifying aspects of readable codes such as bar codes, QR codes, band codes, color codes or other patterns of identifying information. Such identification allows for authenticating and verifying medical equipment, which in turn helps reduce risk of patient harm, and allows the system to operate in normal fashion.

Figure 10:
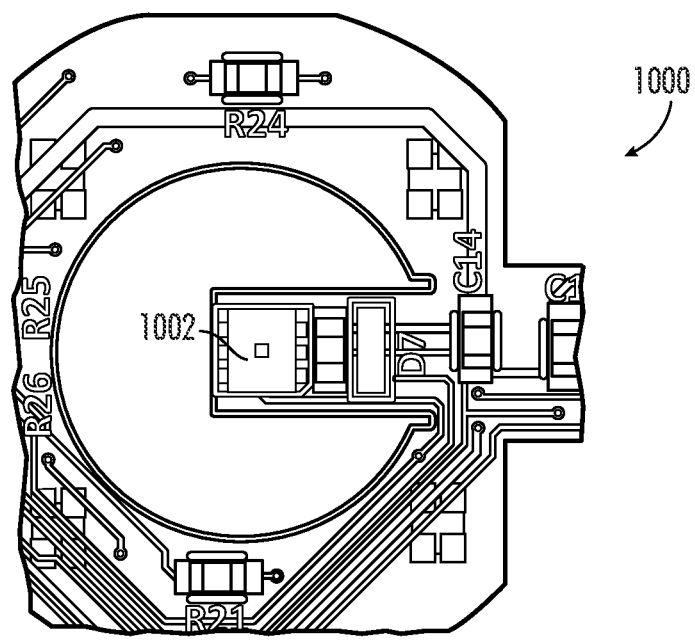
FIG. 10 is an illustration of an example of an electronic illuminator's Rigid-Flex PCB, wherein the flex portion is disclosed with the cap color detection assembly.

Referring now to FIG. 10, an illustration of an example of an electronic illuminator's Rigid-Flex PCB, wherein the flex portion is disclosed with the cap color detection assembly 1000. In one aspect the R/G/B sensor 1002 has an IR filter and white LED module. An example of an R/G/B sensor is the TCS34725, manufactured by TAOS™ (Texas Advanced Optoelectronic Solutions). In one aspect the R/G/B sensor 1002 returns and processes analog to digital values for a sensed object, such as a cap or band pattern. Further, in some aspects, the R/G/B sensor 1002 of the cap color detection assembly 1000 also allows for ambient light sensing for functions such as power savings, in use, security, and authentication. In one aspect the R/G/B sensor 1002 contains an 3×4 photodiode array and four analog to digital converters that integrate the photodiode, data registers, a state machine, and an I²C interface.

In additional aspects a watermark, or color array, for a series of color bands may be used for security and authentication. In one aspect a series of banded color codes is placed and read by the cap color detection assembly within the electronic illuminator. If the color code is a match the electronic illuminator functions, if the color code is not a match the electronic illuminator provides notification. Notification can consist of a signal or transmission, or other notification that the fiber is either not genuine, or is inserted incorrectly, or there is a failure within the system. Additionally, in another aspect, the color bands or watermark may also provide input to the electronic illuminator regarding the LED transmission color to illuminate the fiber line with.

Figure 11:
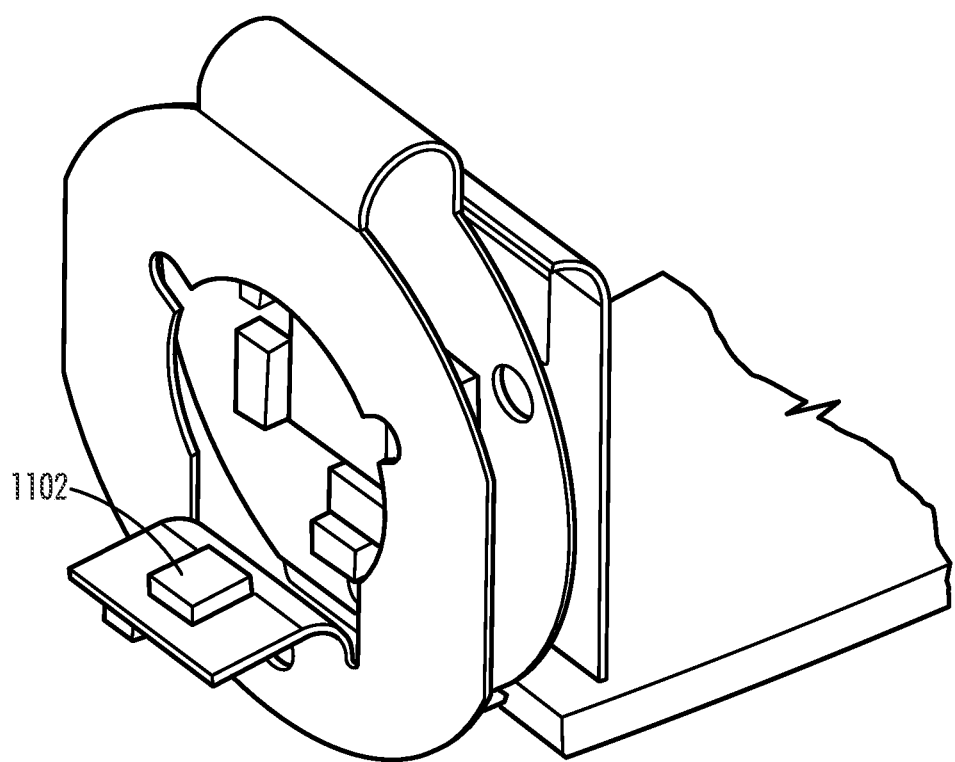
FIG. 11 is an illustration of an example of an electronic illuminator, disclosing the cap color detection assembly configuration within the electronic illuminator.

Referring now to FIG. 11, an illustration of an example of an electronic illuminator, disclosing the cap color detection assembly configuration within the electronic illuminator. In the example view the fiber funnel cap is disclosed wherein it is configured with the electronic illuminator. The R/G/B sensor 1102 of the cap color detection assembly is configured to interface with the cap of the fiber optic line. Further, the position of the R/G/B sensor 1102 also accounts for reading of a unique band code or code on the cap side or funnel cap that codes for a specific light, or for authentication, or additional features as programmed within the system. In one aspect, the multiple band code identifies red and the power driver of a red LED is turned on.

Figure 12:
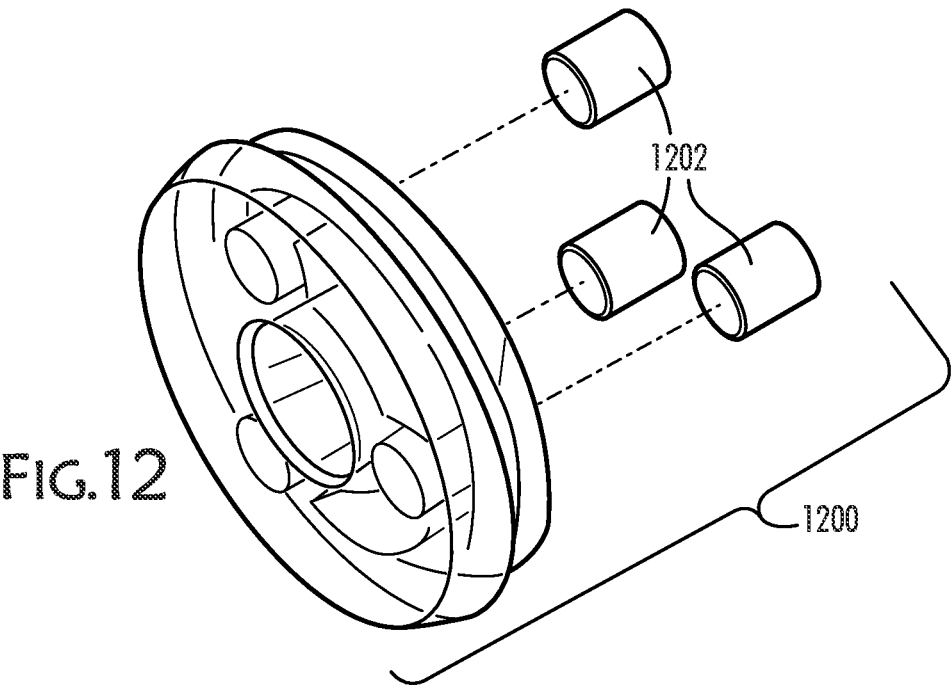
FIG. 12 is an illustration of an example cap and magnet array for an electronic illuminator, the configuration provides aspects of the fiber detection assembly.

Referring now to FIG. 12, an illustration of an example translucent cap 1200 and magnet array 1202 for an electronic illuminator, the configuration provides aspects of the fiber detection assembly. The cap may be translucent and work in coordination with the optical sensor disclosed above, for sensing environmental light and light leakage from the side scattering fiber optic line. The translucent cap 1200 is fitted to the electronic illuminator forming a part of the housing. Disclosed within FIG. 12 is positioning for a plurality of magnets to form a magnetic field. Such field may be utilized for authentication, activation, security, and transmission of information utilizing a specific flux key or signature.

Figure 13:
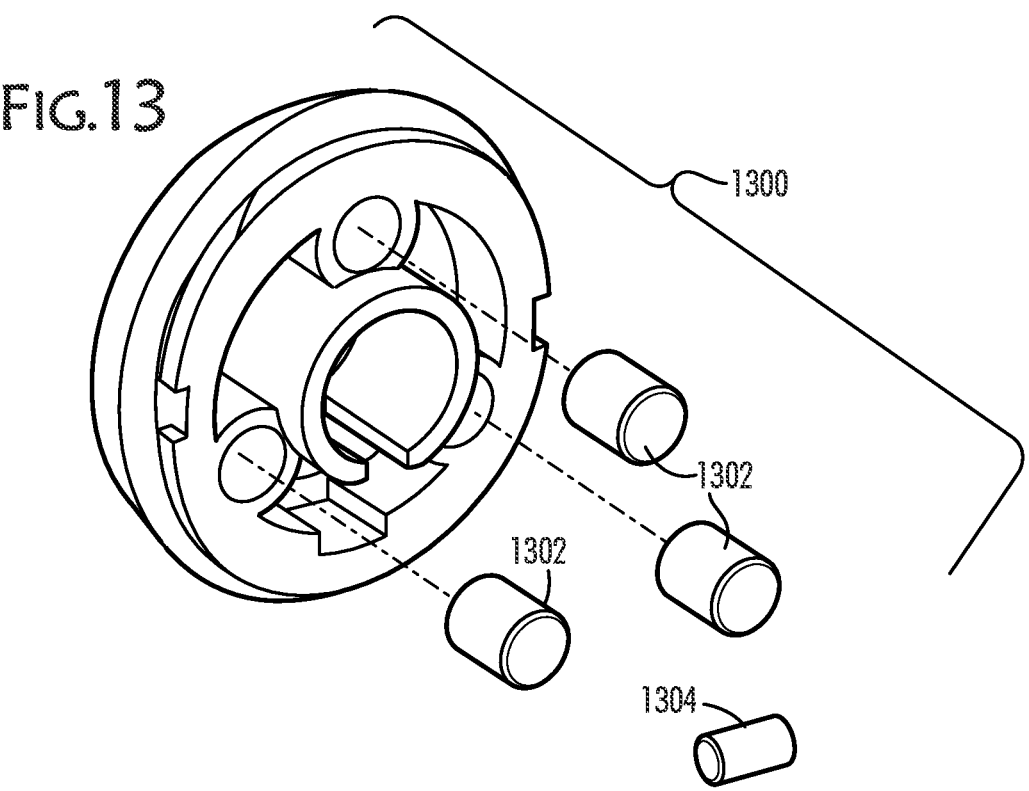
FIG. 13 is an additional illustration of an example cap and magnet array with a steel bar for an electronic illuminator, the configuration provides aspects of the fiber detection assembly.

Similarly, referring to FIG. 13, an additional illustration of an example translucent cap and magnet array 1302 with a steel bar 1304 for an electronic illuminator, the configuration provides aspects of the fiber detection assembly. The steel bar 1304 provides tuning of magnetic field to allow for tuning of specific fields, allowing for more than authentication, but having different flux keys or signatures result in different effects, such as programmed to a specific color, or pattern for the LED driver. With regard to authentication, the steel bar 1304 may also be a magnetic bar and it is utilized in tuning, the electronic illuminator may also not require a steel bar 1304 and the system may operate with a three dimensional magnetic flux based on the magnet array 1302, wherein the key or signature is determined by the metallic plate on the funnel cap being engaged with the electronic illuminator.

Figure 14:
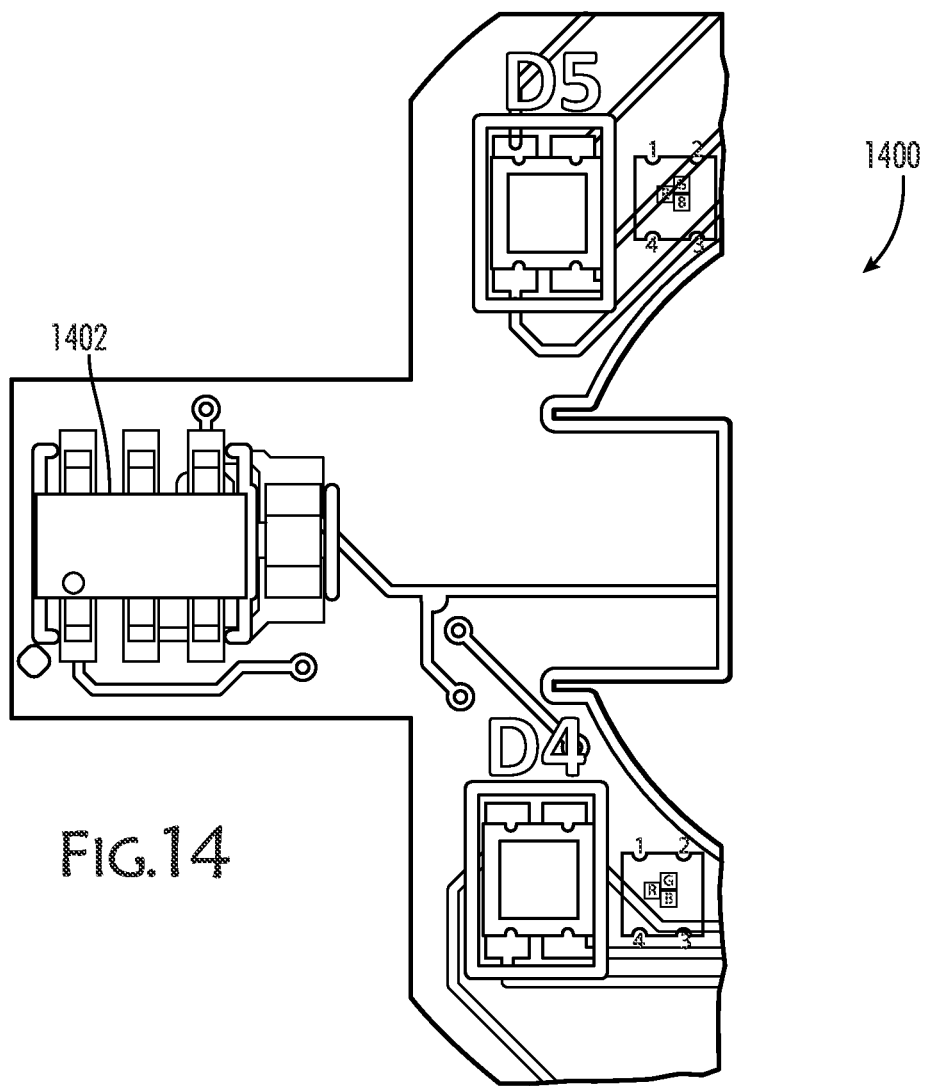
FIG. 14 is an illustration of an example fiber detection assembly, wherein the Rigid-Flex PCB is disclosed with a Hall sensor.

Referring now to FIG. 14, an illustration of an example fiber detection assembly, wherein the Rigid-Flex PCB 1400 is disclosed with a Hall sensor 1402. A Hall sensor also known as a Hall-effect sensor is a device that measures the magnitude of a magnetic field. A Hall sensor's output voltage is directly proportional to the magnetic field strength through it. Hall sensors are used for proximity sensing, positioning, speed detection, and current sensing applications. Frequently, a Hall sensor is combined with threshold detection, so that it acts as and is called a switch. Commonly seen in industrial applications, Hall sensors are also used in consumer equipment and medical applications; for example, some computer printers use Hall sensors to detect missing paper and open covers. They can also be used in computer keyboards, an application that requires ultra-high reliability. An example of a Hall sensor is the US1881 by Melexis™ that is based on mixed signal CMOS technology. In one aspect, the Hall sensor is equipped with high magnetic sensitivity, has an operating voltage of 3.5V up to 24V, and a low current consumption.

In one aspect, the Hall sensor 1402 on the electronic illuminator detects the presence of the fiber line through a series of magnets, such as a magnetic assembly, that is placed on the front cap or translucent ring of the electronic illuminator. In one embodiment the electronic illuminator creates a 3D magnetic flux density that is capable of sensing to +/−160 mT. In other embodiments a range exists over +/−160 mT. The Hall sensor is equipped with a programmable flux resolution to 65 uT. Therefore, enabling position detection and X-Y angular and fiber orientation and measurements. The three dimensional magnetic flux is also known as a magnetic flux key or signature, and such signature can be used for authentication and verification of the illuminating infusion line or the fiber line. Further, in other aspects, the Hall sensor 1402 controls the power supply and sleep wake functionality. The hall sensor 1402 is further equipped to provide energy saving aspects by controlling functionality of on/off, sleep/wake, rest state of a microcontroller. In other aspects, the Hall sensor 1402 enables device security through detection of a flux key or signature.

In the example of FIG. 14, in one aspect of the electronic illuminator a plurality of magnets for a magnetic field that can be registered by onboard sensors, such as a hall sensor, the flux may be used to verify the device is in use or other aspects such as security and authentication. In such a scenario the magnetic field is tuned to a flux key or signature so as to authentic the device. In one aspect a steel pin is utilized to adjust the flux field, in another a different material capable of disturbing magnetic force is used. In one aspect the steel pin is set to match the signature of a specific funnel color of illuminating fiber optic line. In another aspect the steel pin or other magnetic flux disturbing device is positioned for specific voltage readings from the Hall sensor. In such an embodiment authenticating the various attachment fiber optic lines can be observed. Further, in additional embodiments the sleep wake function of the microcontroller may be activated by the Hall sensor, thus allowing power conservation.

Continuing with FIG. 14, in one aspect the fiber funnel cap may be a specific color that designates the color of LED light the LED power driver will illuminate within the electronic illuminator. The fiber funnel cap is located proximal to the electronic illuminator, and at the opposite end of where the fiber line terminates. The distal end of the fiber line may have a protective distal cap. In one aspect, the fiber funnel cap may be equipped with a metal plate to match and verify a specific signature (magnetic flux key, flux signature) wherein the electronic illuminator's Hall sensor, as part of the fiber line detection assembly, can sense and acknowledge the signature or voltage change. In some aspects, the fiber side cap, equipped with a magnetic plate is used for authentication and verification. In other aspects, the fiber side cap is utilized for providing instruction to the electronic illuminator. In additional aspects, an antenna may be placed on the proximal cap cover of the fiber line, in which the microcontroller may send a radio pulse and receive a signal, this embodiment may be tied to an optical power sensor, or the microcontroller, or both.

Figure 15:
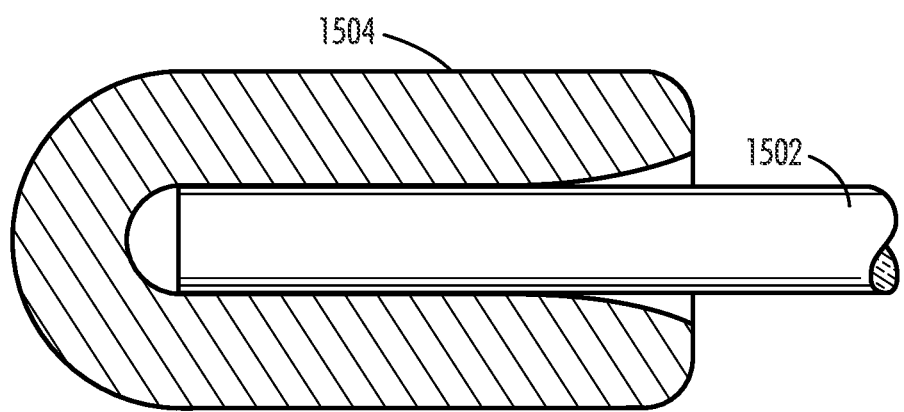
FIG. 15 is an illustration of a distal end cap, also known as a protective end cap on a side emitting fiber optic line.

Referring now to FIG. 15, an illustration a distal end cap of a side scattering or side emitting fiber optic line. In the example the protective end cap 1504 for the side scattering fiber optic line 1502 has a polished or painted surface that is highly reflective of light. The polished or painted surface allows for reflection, similar to a mirror, wherein the programmed MCU on the PCB may initiate a sequence of flashes or pulses for authentication or verification. These pulses or flashes emanate from the LED on the electronic illuminator, travel the length of the side scattering fiber optic cable, and are reflect back from the protective end cap into the electronic illuminator where the ambient light sensor detects the pulses or flashes and interprets the signal. Additionally, a routine of pulsed light may be used for signaling the length of the fiber optic line 1502, for regulating intensity of the LED and thus controlling power drivers and saving power. If the pulsed light is not returned at a specific strength of lux it may be determined the side scattering fiber optic line is too long for usage or it may adjust power of the LED in order to broadcast along a longer fiber optic cable. This may work in coordination with the ambient light sensor, disclosed previously, to regulate power output based on the environmental light and length of the fiber optic line 1502.

Continuing, the protective end cap 1504, with a polished surface, is also made of a resilient material such as a hard plastic or metal that allows for protection of the fiber optic line 1502 so it does not fray or come into contact with patients. Additionally, the protective end cap is smooth and made to be non-abrasive and easy to clean, with no openings or otherwise which allows for prevention of bacterial growth and reusability.

Further, the protective end cap 1504 may be equipped with a one line antennae that is utilized for communicating over radio frequency, thus adding an additional layer of communication to the fiber optic line. The one line antennae acts as a passive wireless antenna and may be used for determining fiber optic line length or for verification and authentication.

Referring now to FIGS. 16A-C, disclosed are various aspects of a fiber funnel cap 1602 that is designed to engage with the electronic illuminator, through the translucent ring or other receiving assembly on the housing to the lens of the electronic illuminator for transmitting line through the side scattering or side emitting fiber optic line. The fiber funnel cap, in one aspect, is also configured with a metal plate that may be utilized for magnetically locking the cap into the electronic illuminator or for tuning with a magnetic flux. For example, the metal plate 1604 may also be used for authentication and verification in coordination with the fiber detection assembly and the onboard hall sensor by a magnetic flux key or signature. In this regard, the metal plate 1604 is characterized by a specific angle vector relative to the onboard magnet assembly of the electronic illuminator, thus creating a magnetic flux signature or key.

Continuing, the fiber funnel cap 1602 may come in a variety of colors and the color is detected by the cap color detection assembly, wherein the MCU may power an LED driver to the specific cap color. Further, the fiber funnel cap 1602 may be equipped with bands, such as a multiple band code, or a SKU, or QR code, that allows for the R/G/B sensor of the cap color detection assembly to read the bands or code and transmit to the MCU a signal for the color to illuminate by the LED power driver. Therefore, the fiber optic cable, including the fiber funnel cap may be "programmed" from manufacture to illuminate a specific LED driver within the electronic illuminator. The system therefore reduces cognitive load on practitioners as the fiber funnel caps are coded with the matching color, reducing overhead and allowing design to provide function.

IV. Embodiments

Certain implementations of systems and methods consistent with the present disclosure are provided as follows:

Implementation 1. A system for medical infusion line illumination, comprising (i) an electronic illuminator, comprising: a printed circuit board ('PCB'); a light emitting diode ('LED'); a lens; a power source; and at least one sensor assembly. (ii) a side scattering fiber optic cable, comprising: a funnel cap at a proximal end to receive light from the LED through the lens of the electronic illuminator; and a protective end cap at a distal end, wherein the protective end cap is polished on an interior surface to reflect light from the LED of the electronic illuminator.

Implementation 2. The system of implementation 1, wherein the at least one sensor assembly is an ambient light sensor, the ambient light sensor converts light intensity to a digital signal.

Implementation 3. The system of implementation 1, wherein the at least one sensor assembly is a fiber detection assembly, having a three dimensional magnetic flux density.

Implementation 4. The system of implementation 3, wherein the fiber detection assembly comprises a hall effect sensor.

Implementation 5. The system of implementation 3, wherein the fiber detection assembly is comprised of three magnets and a steel bar.

Implementation 6. The system of implementation 1, wherein the at least one sensor assembly is an optical power sensor assembly, the optical power sensor assembly detects travel time from the proximal end of the side scattering fiber optic cable to the terminal end of the side scattering fiber optic cable.

Implementation 7. The system of implementation 1, wherein the at least one sensor assembly is a cap color detection assembly, wherein the cap color detection assembly detects color of the funnel cap on the fiber optic cable.

Implementation 8. The system of implementation 7, wherein the cap color detection assembly comprises a photoelectric sensor.

Implementation 9. The system of implementation 7, wherein the cap color detection assembly comprises a RGB sensor.

Implementation 10. The system of implementation 7, wherein the cap color detection assembly comprises a color code band detection, wherein the cap comprises a multiple band color code.

Implementation 11. The system of implementation 1, further comprising a housing for the electronic illuminator comprised of an external heat sink.

Implementation 12. The system of implementation 11, wherein the external heat sink is in thermal connection with an internal heat sink.

Implementation 13. The system of implementation 12, wherein the internal heat sink is in thermal connection with the LED.

Implementation 14. The system of implementation 1, wherein the power source is a battery.

Implementation 15. The system of implementation 14, wherein the battery is separated from a terminal by split paper.

Implementation 16. The system of implementation 1, wherein the electronic illuminator further comprises a translucent cap, the translucent cap is utilized by an ambient light sensor to control the LED.

Implementation 17. The system of implementation 1, wherein the electronic illuminator further comprises a removable end cap with a negative battery terminal.

Implementation 18. The system of implementation 17, wherein the removable end cap comprises an antenna.

Implementation 19. The system of implementation 1, wherein the funnel cap of the side scattering fiber optic cable is configured with a metal plate.

Implementation 20. The system of implementation 1, wherein the protective end cap of the side scattering fiber optic cable further comprises a one line antenna sensor.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for medical infusion line illumination, comprising:
   (i) an electronic illuminator, comprising:
      a printed circuit board ('PCB');
      a light emitting diode ('LED');
      a lens;
      a power source; and
      at least one sensor assembly, the at least one sensor assembly comprising a fiber detection assembly, having a three dimensional magnetic flux density, and
   (ii) a side scattering fiber optic cable, comprising:
      a fiber funnel cap at a proximal end to receive light from the LED through the lens of the electronic illuminator; and
      a protective end cap at a distal end, wherein the protective end cap is polished on an interior surface to reflect light from the LED of the electronic illuminator,
   wherein the electronic illuminator determines that the three dimensional magnetic flux density corresponds to a specific color or a specific pattern, and wherein the electronic illuminator uses the specific color and pattern to drive the LED.

2. The system of claim 1, wherein the at least one sensor assembly further comprises an ambient light sensor, the ambient light sensor converts light intensity to a digital signal.

3. The system of claim 1, wherein the fiber detection assembly comprises a hall effect sensor.

4. The system of claim 1, wherein the fiber detection assembly is comprised of three magnets and a steel bar.

5. The system of claim 1, wherein the at least one sensor assembly further comprises an optical power sensor that detects travel time from the proximal end of the side scattering fiber optic cable to the distal end of the side scattering fiber optic cable.

6. The system of claim 1, wherein the at least one sensor assembly further comprises a cap color detection assembly, wherein the cap color detection assembly detects color of the fiber funnel cap on the side scattering fiber optic cable, wherein the electronic illuminator is configured to drive the LED to match the color of the fiber funnel cap.

7. The system of claim 6, wherein the cap color detection assembly comprises a photoelectric sensor.

8. The system of claim 6, wherein the cap color detection assembly comprises a RGB sensor.

9. The system of claim 6, wherein the cap color detection assembly comprises a multiple band code detection sensor, wherein the fiber funnel cap comprises a multiple band code, wherein:
   in response to the multiple band code matching an authentic code, the electronic illuminator is configured to continue to function; and
   in response to the multiple band code not matching the authentic code, the electronic illuminator is configured to output an alert.

10. The system of claim 1, further comprising a housing for the electronic illuminator comprised of an external heat sink.

11. The system of claim 10, wherein the external heat sink is in thermal connection with an internal heat sink.

12. The system of claim 11, wherein the internal heat sink is in thermal connection with the LED.

13. The system of claim 1, wherein the power source is a battery.

14. The system of claim 13, wherein the battery is separated from a terminal by split paper.

15. The system of claim 1, wherein the electronic illuminator further comprises a translucent cap, the translucent cap is utilized by an ambient light sensor to control the LED.

16. The system of claim 1, wherein the electronic illuminator further comprises a removable end cap with a negative battery terminal.

17. The system of claim 16, wherein the removable end cap comprises an antenna.

18. The system of claim 1, wherein the fiber funnel cap of the side scattering fiber optic cable is configured with a metal plate.

19. The system of claim 1, wherein the protective end cap of the side scattering fiber optic cable further comprises a passive one line antenna sensor, wherein the passive one line antenna sensor communicates with the electronic illuminator to provide, to the electronic illuminator, information used in authentication of the side scattering fiber optic cable, wherein the electronic illuminator is configured to perform the authentication using the at least one sensor assembly.

20. The system of claim 1, wherein the electronic illuminator is further configured to, based on the strength of the reflected light from the LED, determine that a length of the side scattering fiber optic cable exceeds a value, and wherein the electronic illuminator adjusts the power output of the LED in response to the determination that the length of the side scattering fiber optic cable exceeds the value.

* * * * *